Patented Oct. 17, 1944

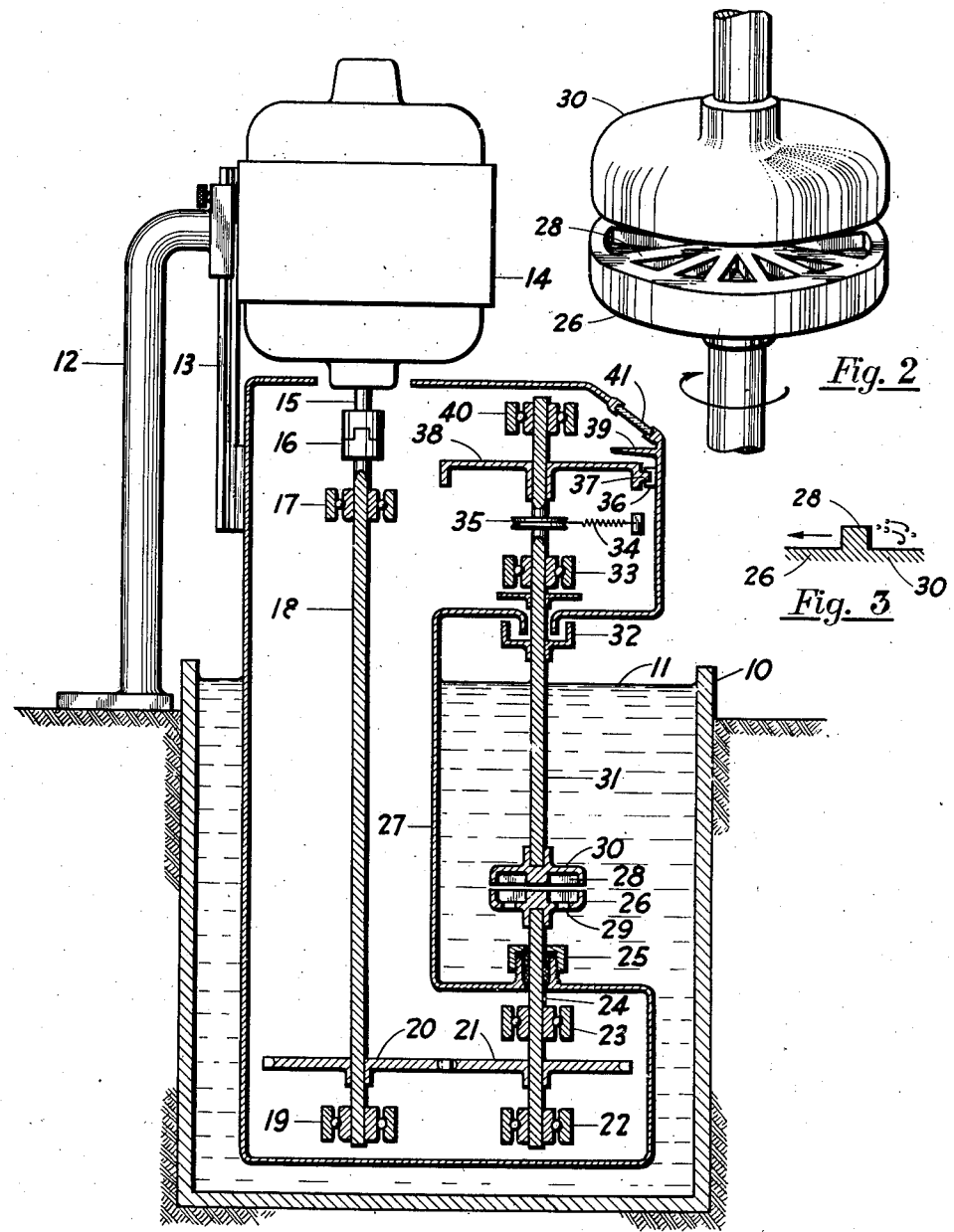

2,360,546

UNITED STATES PATENT OFFICE 2,360,546

METHOD OF MEASURING LIQUID DENSITY

William T. Cardwell, Jr., Whittier, Calif., assignor to Standard Oil Company of California, San Francisco, Calif., a corporation of Delaware Application September 28, 1942, Serial No. 459,919

5 Claims. (Cl. 73—32)

This invention relates to a method of continuously measuring the density of liquid, and particularly of liquid, such as drilling mud, which flows continuously in a conduit and is susceptible to rapid changes in density due to the intrusion of water, physico-chemical changes, and the like.

Heretofore the density of drilling mud and the like has been measured by weighing a given quantity and comparing that weight with the weight of an equal volume of water. This is an intermittent process at best; and even if semi-continuous weighings are to be made, it requires an elaborate mechanism or the continuous attendance of an operator.

This invention comprehends broadly a method of measurement of the density of liquids in which a confined body of the liquid is given a substantially constant degree of turbulence, for example that due to a rotating turbulence generator, the opposite side of the body being in contact with a drag member, preferably resiliently and movably supported, the measurement of the force, such as torque, transmitted to said drag member being substantially proportional to the density of the liquid and substantially independent of its viscosity.

It is known (United States Patent No. 1,664,752) that the density of a gas may be measured by imparting a motion to the gas, and causing the moving gas to act upon a movable, resilient element. By very simple means the displacement of the said movable element may be caused to measure the density of the gas. But, heretofore, it has not been found possible to use an analogous method for measuring the densities of liquids. There were two apparent difficulties: First, the attempted liquid density measurements appeared to depend not only upon the densities of the liquids, but also upon their viscosities. Second, when a rotatable impeller was set in motion in a liquid whose surface was in contact with air, or other gas, vortices were formed that drew gas from the liquid surface into the space between the impeller and the drag member, causing the medium between those elements to become an indefinite mixture of liquid and gas, having, consequently, an indefinite density. Both of these difficulties have been solved by the present invention.

When a liquid and a body immersed therein are in relative motion, the power required to maintain the motion depends in general upon the geometry of the body, the geometry of the external fluid boundaries, the velocity of motion, the liquid viscosity, and the liquid density. If, however, the degree of turbulence is high enough, the effects of the external boundaries, and even the effects of the liquid viscosity tend to become negligible. In the case of an immersed body of a given shape moving with respect to the liquid with a given constant velocity, the power varies substantially only with the liquid density. The motion of the body with respect to the liquid may be of either a rotational or linear nature; but because a rotational motion is generally more easily obtained, the following mathematical example will deal with that type of motion.

An impeller disk with sharp-edged, raised vanes, rotating at a constant, high speed may be used to create a turbulent rotational motion in a liquid. If another similar disk, which may be called the drag member, is immersed in the liquid in the vicinity of the impeller, it will tend to rotate under the influence of the fluid motion, or, otherwise stated, a torque will be transmitted from the impeller to the drag member. If the latter is pivoted and restrained against rotation, the torque, L, thus impressed upon it is not, in the general case, merely a function of the liquid density, but depends upon the following quantities:

$u$ = liquid viscosity
$w$ = relative angular velocity of impeller and drag member
$R$ = common radius of impeller and drag member
$t$ = separation of impeller and drag member
$\rho$ = liquid density
$p$ = viscosity dependence exponent, a function of the degree of turbulence
$q$ = separation-radius ratio exponent, also a function of the degree of turbulence.

The viscosity dependence exponent $p$ is the exponent that defines the variation of the torque $L$, with respect to the dimensionless group $$\frac{u}{wRt\rho}$$

and therefore is the number that defines the variation of the torque with respect to the viscosity if all the other variables are held constant. The explicit function is not known but is similar in nature to the slopes of diagrams comparing friction factor with Reynolds number, as in the book "Principles of Chemical Engineering," Walker, Lewis, McAdams and Gilliland; third edition; McGraw Hill, 1937, page 78. The fact that these slopes or exponents can be given as explicit functions only if turbulence does not exist, and otherwise must be determined experimentally, is one of the difficulties encountered in the study of turbulent motion, and is well known to those skilled in this art.

Dimensional considerations show that the torque, L, must be represented by a function of the following form:

$$L = \rho w^2 R^5 \left(\frac{u}{wRt\rho}\right)^p \left(\frac{t}{R}\right)^q$$

This equation is derived by dimensional analysis, which is outlined in detail in "Dimensional Analysis," P. W. Bridgman, Yale University Press, 1937, and in "Fluid Mechanics for Hydraulic Engineers," H. Rouse, McGraw Hill, 1938, chapter 1. The derivation of the equation is briefly as follows:

Let the torque, L, be a function of the variables $u$, $w$, $R$, $t$, and $\rho$. Over a sufficiently restricted range of the variables the dependence of L may be represented by a form $$L = u^a w^b R^c t^d \rho^e \qquad (1)$$

where $a$, $b$, $c$, $d$, and $e$ are numerical exponents. If the right-hand side of Equation 1 is to have the same physical dimensions as the left-hand side, the numerical exponents must satisfy the following relation:

$$[ML^2T^{-2}] = [ML^{-1}T^{-1}]^a [T^{-1}]^b [L]^c [L]^d [ML^{-3}]^e \qquad (2)$$

where M represents mass, L, length, and T, time. The dimensions of torque are $ML^2T^{-2}$, etc. Now since the exponents of mass are the same on both sides of Equation 2, it follows that:

$$1 = a + e \qquad (3)$$

Operating similarly with the exponents of length and time, it follows that:

$$2 = -a + c + d - 3e \qquad (4)$$

and $$-2 = -a - b \qquad (5)$$

Here are three simultaneous equations in five unknowns. Two quantities must therefore remain unknown. Let these be $a$ and $d$. One can then solve for the other quantities:

$$b = 2 - a \qquad (6)$$

$$c = 5 - 2a - d \qquad (7)$$

$$e = 1 - a \qquad (8)$$

Finally, upon inserting these quantities into Equation 1, one obtains:

$$L = u^a w^{2-a} R^{5-2a-d} t^d \rho^{1-a}$$

or $$L = \rho w^2 R^5 \left(\frac{u}{wR^2\rho}\right)^a \left(\frac{t}{R}\right)^d \qquad (9)$$

Equation 9 is in a form similar to the equation desired. To convert to the identical form, let $p$ and $q$ be defined as follows:

$$p = a \qquad (10)$$

and $$q = d + a \qquad (11)$$

It then follows that:

$$L = \rho w^2 R^5 \left(\frac{u}{wRt\rho}\right)^p \left(\frac{t}{R}\right)^q \qquad (12)$$

This is the desired result.

Now, it can readily be seen that the exponent, $p$, is exceedingly important in determining the type of torque transmission. If $p$ equals zero, the torque transmission will be independent of the liquid viscosity, and will be directly proportional to the density. On the other hand, if $p$ is unity, the torque transmission will be independent of the density, and directly proportional to the liquid viscosity. Thus it is apparent that an instrument that produced a motion characterized by a $p$ value of unity would be useless as a density indicator; instead, it would function as a viscometer. On the other hand, only an instrument that produced a motion characterized by a very low $p$ value could function as a density indicator. For the purposes intended by the present invention, it has been found necessary to obtain a $p$ value of 0.01, or less.

It has been found that by choosing a suitably designed impeller and drag member, designed so as to create a very high degree of turbulence in the liquid, and by rotating the impeller at a sufficient speed, the exponent $p$ may be reduced to 0.01, and it may be anticipated that further extension of the method will produce even smaller viscosity dependence exponents.

It is an object of this invention to provide a method for continuously determining the density of a flowing stream of liquid, for example drilling mud, which may be a thin slurry of clay or other colloidal material in a vehicle such as water or oil. The determination is substantially only a function of density, and substantially independent of the viscosity of the flowing liquid, at least within the range commonly used in this art.

Another object is to provide a simple method for determining the density of drilling mud flowing in an open channel or conduit, and readily accessible for inspection or cleaning.

These and other objects of the invention will become more fully apparent from the appended drawing, which forms a part of this specification, and from the following description of the apparatus illustrated in the drawing, showing one mode of application of this invention.

In the drawing,

Figure 1 is a diagrammatic, vertical, part-sectional view of an apparatus suitable to practice this invention in place in an open conduit carrying the liquid whose density is to be measured.

Figure 2 is a diagram in perspective of the impeller element and drag element of the instrument of Figure 1.

Figure 3 is a cross-sectional view of one of the vertical vanes of the impeller element. The view is taken in a plane parallel to the axis of rotation of the impeller, but not containing said axis.

Referring to Figure 1 of the drawing, reference numeral 10 illustrates an open conduit through which a continuous stream of liquid 11, which may be drilling mud, is flowing. At one side of the conduit 10 is a support 12 adapted to receive a vertically slidable carriage 13 on which is mounted a motor 14 which rotates at a high and constant speed. Desirably, but not necessarily, this is a synchronous motor driven from a constant frequency electric power source, not shown. The motor shaft 15 is connected by means of the coupling 16 to the shaft 18, which passes downward through the two bearings 17 and 19, and terminates in the gear 20. Gear 20 is meshed with gear 21 which is attached to shaft 24 passing vertically through the bearings 22 and 23. The parts numbered from 15 to 24 are enclosed in liquid-proof housing 27. The shaft 24 protrudes from the housing 27 through the packing gland 25 and terminates in the impeller element 26, which is preferably in the shape of a disk having a plurality of closely spaced radial fins 28 at right angles to its upper face. A series of holes 29 may be placed in the impeller element in order to increase the liquid flux caused by the impeller. Directly above the impeller element 26 is the similar, but inverted, drag member 30 fixed to the end of the shaft 31, which is coaxial with the shaft 24. The shaft 31 projects upwardly out of the liquid and through the labyrinth 32 which prevents the splashing of liquid into the opening through which shaft 31 extends into the housing 27. Inside the housing 27, the shaft 31 is supported in the bearings 33 and 40. Shaft 31 is resiliently restrained against rotation by the spring 34 attached tangentially to the wheel 35, which is rigidly attached to shaft 31. A motion limiting abutment 37 adapted to cooperate with a stop pin 36 attached to the main frame may also be provided. The shaft 31 is provided with a cylindrical rim or drum 38 upon the edge of which a suitable scale for indicating the degree of rotation of the drum may be placed. A pointer 39 is adapted to cooperate with the scale markings to indicate the deflection of drum 38 from a zero or null position. The scale readings may be observed through the window 41.

Referring to Figures 2 and 3 of the drawing, the reference numeral 26 again represents the impeller member, and numeral 30 represents the drag member. It has been found that the raised vanes 28 should preferably be of the form indicated in Figure 3, with sharp edges so as to cause the maximum amount of turbulence. It has been found that with an impeller member 2.75 inches in diameter provided with 8 vanes 0.125 inch high and 0.07 inch wide, and a speed of rotation of 1500 revolutions per minute or over, a degree of turbulence may be reached that is characterized by a viscosity dependence exponent of only 0.01, as shown by the following table prepared from the results of several experiments.

TABLE I

*The torques transmitted through water and a viscous bentonite suspension*

| Liquid | Residual viscosity (centipoises) | L, average torque (oz. ins.) | ρ, density (p. c. f.) | L/ρ |
| --- | --- | --- | --- | --- |
| Water | 1 | 10.7 | 62.4 | 0.171 |
| B-suspension | 53 | 11.2 | 68.5 | 0.164 |

The difference in viscosities was 5,300%.
The difference in the torque-density ratios was only 4%.

Using the above results, it may be easily calculated that the viscosity dependence exponent was approximately 0.01. Thus, even with this arrangement the torque measured at the shaft was not solely a function of the density of the liquid being measured, but was also slightly affected by variations in voscosity. But only the one-hundredth power of the viscosity was involved, and it is apparent to one skilled in the art that such a viscosity dependence would be insignificant in the field measurement of drilling muds. This point, however, is more conclusively demonstrated by the second group of experiments.

Seven actual drilling fluids were tested in the density indicator. A low density bentonite suspension was included in the tests in order to make the experiments cover a wide range of densities. The experimental results are shown in Table II.

TABLE II

*The torques transmitted through some actual drilling muds*

| Mud (well No.) | Torque, L (oz. ins.) | Density, ρ (p. c. f.) | L/ρ |
| --- | --- | --- | --- |
| 1-10 | 15.7 | 95.5 | 0.164 |
| 1-10 (dil.) | 15.0 | 92.2 | 0.163 |
| 76-19J | 14.7 | 90.2 | 0.163 |
| 11-26 | 13.4 | 82.6 | 0.160 |
| 78-19B | 12.7 | 79.0 | 0.162 |
| 5-17F | 12.5 | 77.0 | 0.162 |
| 2-19F | 12.0 | 73.4 | 0.163 |
| Low dens. bent. | 10.9 | 67.0 | 0.163 |

The inspection of Table II shows that the experimental density indicator gave readings substantially proportional to the densities of the mud tested.

It will be obvious from the foregoing that with a suitable choice of the design and mode of operation of this device, taking care that it operates in the region of high turbulence characterized by a viscosity dependence exponent of about 0.01 or less, an entirely new result may be achieved, namely a new dynamic method for the determination of liquid densities.

It is important to note that the success of the described method depends upon the avoidance of a vortex that would induce air, or other gas, from the surface of the liquid down into the space between the impeller and the drag member, causing the medium between those elements to become an indefinite mixture of liquid and gas, having an indefinite density. Such a vortex has been avoided in the present invention by placing the drag member above the impeller member so as to partially screen the motion of that element from the liquid between it and the gas-liquid interface. Other methods that involved the impartation of unrestricted rotational movement to a substantial body of the liquid between the impeller and the gas-liquid interface have been found to produce a deleterious vortex.

Although a single embodiment of an apparatus suitable for carrying out this method and a relatively limited field of application of it has been indicated, it is to be understood that numerous changes could be made in the construction of the apparatus and also in its mode of operation without departing from the invention. Accordingly, all such modifications and changes that come within the scope of the invention are embraced thereby.

I claim:

1. A method of determining the density of a liquid such as a well drilling mud or the like, by imparting a substantially constant speed of turbulent rotation to one side of a confined body of said liquid and measuring the torque transmitted through said liquid body to a resiliently restrained drag member on the opposite side of said liquid body, said turbulent rotation being characterized by a viscosity dependence exponent of not over about 0.01.

2. A method of determining the density of a liquid such as a well drilling mud or the like, by immersing therein a rapidly rotating turbulence generator and a movable, resiliently restrained drag member, and measuring the deflection of said member by the torque transmitted through the turbulent body of liquid confined between said generator and said member, when the turbulent motion of the liquid between said turbulence generator and drag member has a viscosity dependence exponent of 0.01 or less.

3. A method of determining the density of a liquid such as a well drilling mud or the like, which is flowing in a continuous stream, including the steps of diverting a portion of said stream into a confined space between a rapidly rotating constant speed turbulence generator and a coaxial pivoted drag member, imparting a high degree of turbulence, characterized by a viscosity dependence exponent of 0.01 or less, to the liquid therebetween, and measuring the force exerted on said drag member by the torque transmitted thereto by said turbulent liquid stream.

4. A method of determining the density of a liquid such as a well drilling mud by imparting a high degree of turbulence, characterized by a viscosity dependence exponent of 0.01 or less, to one side of a confined body of said liquid by a continuously moving turbulence generator, opposing a drag member to said turbulence generator across said confined liquid body, and measuring the torque transmitted by said turbulent liquid body to said drag member.

5. The method of measuring the density of a liquid such as well drilling mud or the like, comprising continuously imparting to a body of said liquid a degree of turbulence characterized by a viscosity dependence exponent of 0.01 or less, immersing a drag member in said turbulent liquid body, and measuring the force exerted by said turbulent liquid upon said drag member.

WILLIAM T. CARDWELL, Jr.